Dec. 18, 1951     E. E. LONGFELLOW     2,579,438
SCREW HOLDING SCREW DRIVER
Filed Feb. 15, 1946     2 SHEETS—SHEET 1
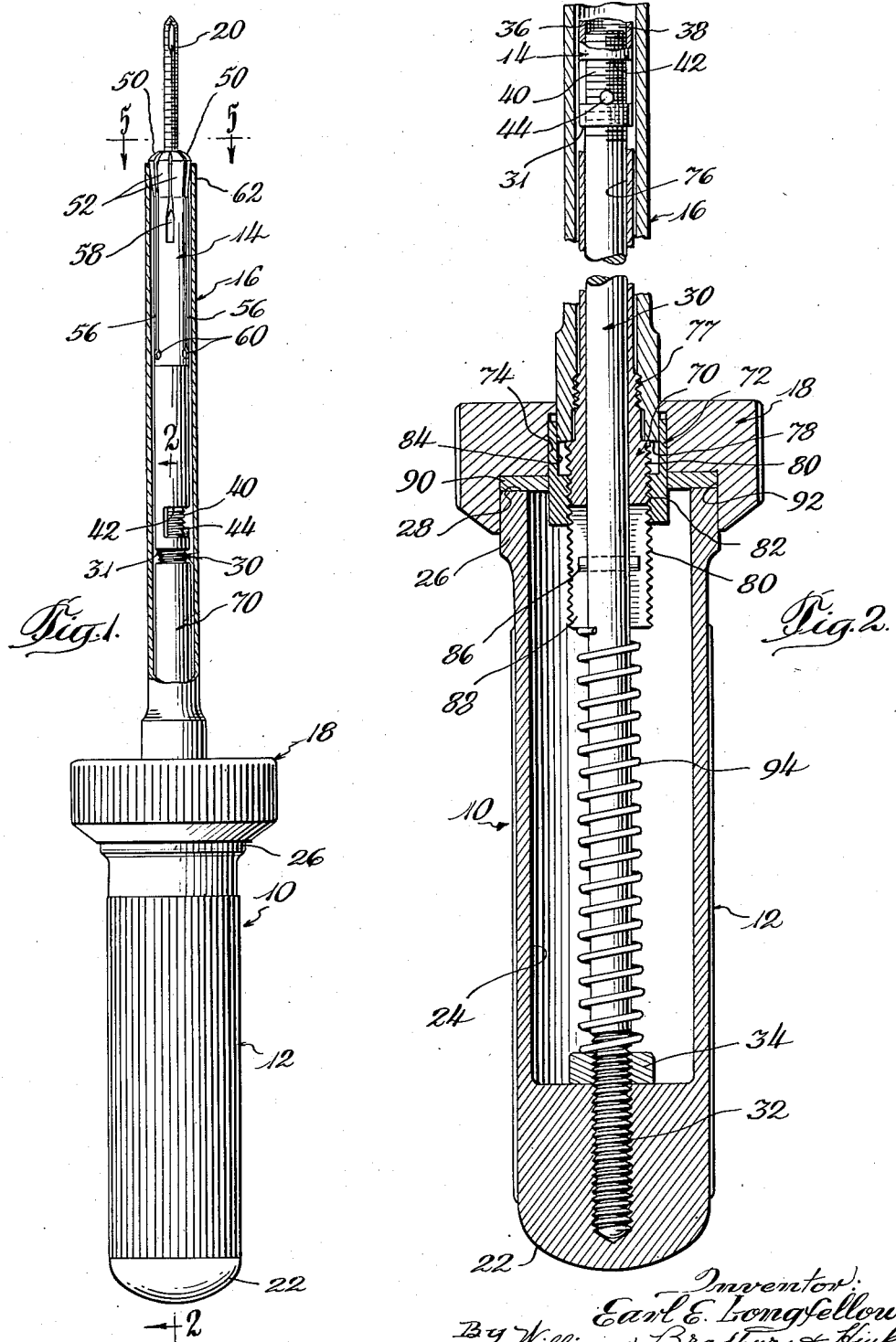
Inventor
Earl E. Longfellow
By Williams, Bradbury & Hinkle
attorneys

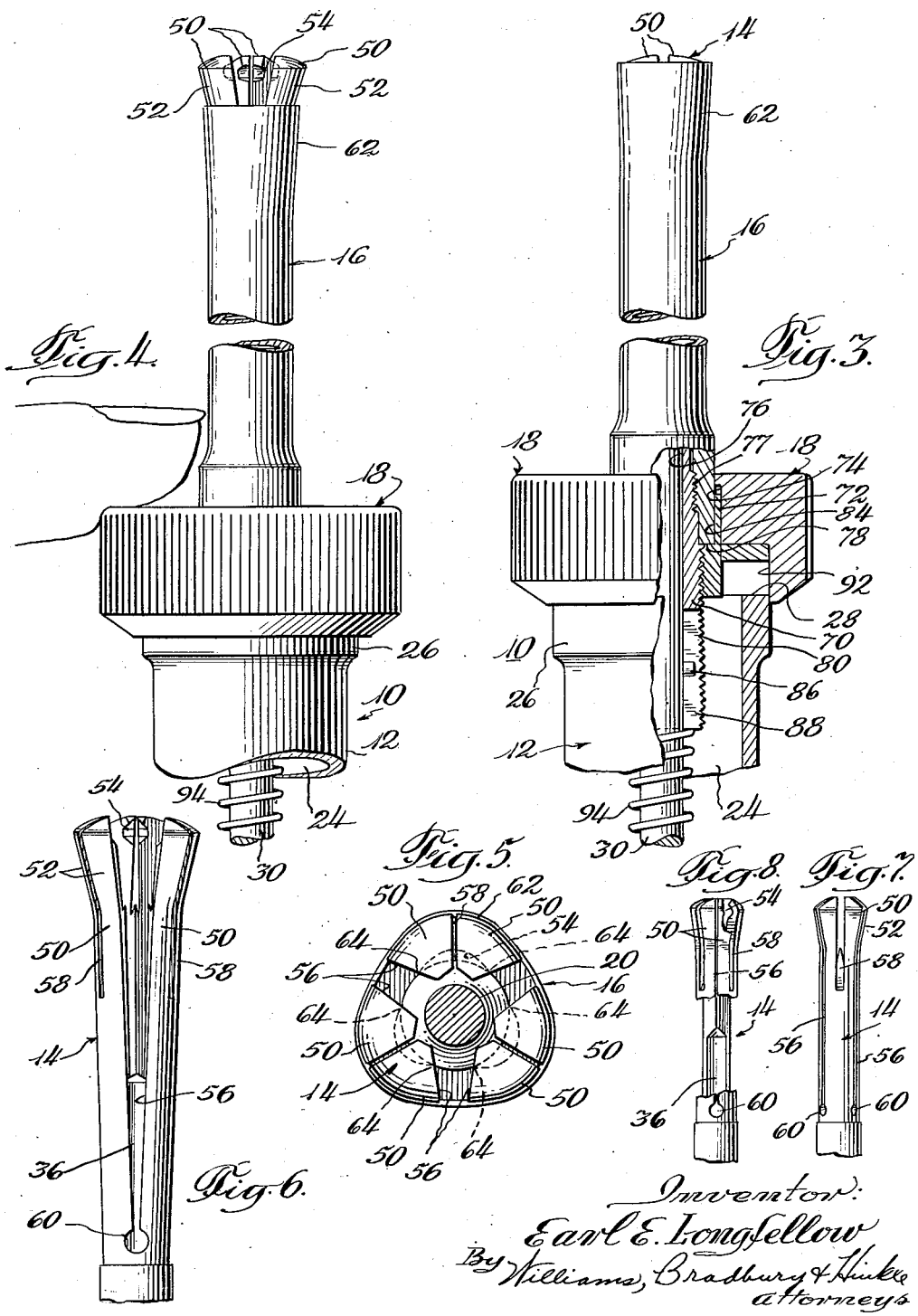

Patented Dec. 18, 1951

2,579,438

UNITED STATES PATENT OFFICE 2,579,438

SCREW HOLDING SCREW DRIVER

Earl E. Longfellow, Warsaw, Ind., assignor, by mesne assignments, to De Puy Manufacturing Company, Inc., Warsaw, Ind., a corporation of Indiana Application February 15, 1946, Serial No. 647,922

7 Claims. (Cl. 145—52)

The present invention relates to a holding device and more particularly to a holding device usable as a screw driver and has for its primary object the provision of a new and improved device adapted especially for use as a surgical screw driver.

Another object of the present invention is to provide a new and improved holding device, especially one usable as a screw driver, so constructed that the user can readily pick up a screw, such as a sterile screw from a towel or the like, securely hold the screw and then drive it into place.

A further object of the present invention is to provide a new and improved collet type holding device including a relatively movable collet tube and collet jaws, the latter of which are normally expanded radially outwardly but are adapted to be contracted by the movement of the tube, and wherein the tube is resiliently biased to move in a direction to contract the jaws and, preferably, substantially enclose them.

A further object of the present invention is to provide a collet type holding device including new and improved relatively movable tube and jaws for securely holding a tool or screw or the like and wherein the force exerted upon the held article is exerted through the collet tube and wherein the jaws will not move relative to the tube when the held article is being manipulated.

Another object of the present invention is to provide a new and improved collet type holding device including a handle and a manually operable rotatably mounted member which can be operated readily to effect expansion of the collet jaws and to effect resilient or positive contraction of the jaws.

A further object of the present invention is to provide a new and improved device of the character set forth in the preceding paragraph which is adapted especially for use as a screw driver and which is manipulatable by one hand.

A further object of the present invention is the provision of a new and improved collet type holding device wherein the jaws are arranged in non-circular relationship, preferably in pairs with spaced apart gripping points, and wherein the collet tube is provided with a portion of like configuration and the turning force is applied through the collet tube, thereby to provide a sturdy construction.

A further object of the present invention is to provide a collet type holding device of the character set forth in the preceding paragraph wherein the collet jaws and tube are easily and automatically aligned, a feature which is provided by mounting the collet jaws, preferably, for limited angular movement.

Other objects and advantages of the present invention will become apparent from the ensuing description of an embodiment thereof, in the course of which reference is had to the accompanying drawings, in which:

Fig. 1 is a side elevational view, partly broken away, illustrating a screw driver, constructed in accordance with the present invention, positively holding a screw;

Fig. 2 is an enlarged fragmentary axial cross-sectional view through the screw driver taken along the line 2—2 of Fig. 1;

Fig. 3 is a fragmentary elevational view, partly broken away, illustrating the screw driver when released and holding no screw;

Fig. 4 is a view similar to Fig. 3 illustrating the screw driver operated so as to be ready to receive a screw;

Fig. 5 is an enlarged fragmentary sectional view taken along the line 5—5 of Fig. 1 and illustrating the top of the screw driver when holding a screw;

Fig. 6 is an elevational view of the collet jaw structure in expanded position, i. e., when they are unrestrained by the collet tube; and Figs. 7 and 8 are fragmentary elevational views of the collet jaw structure as it appears at an intermediate step during construction.

The holding device of the present invention, which is particularly adapted for use as a screw driver, has been illustrated in conjunction with a surgical screw driver. It can be manipulated to pick up and to hold securely a screw so that the screw can be driven. The screw is releasable after it has been driven substantially all the way in. Furthermore, the construction is such that the collet jaws are resiliently biased initially to hold the screw after which the screw driver can be operated positively to hold the screw.

Referring now to the drawings and, first, particularly to Figs. 1 and 2, it may be noted that the screw driver 10 of the present invention includes a generally cylindrical exteriorly knurled handle 12, collet jaw defining structure 14 encircled by a collet tube 16 movable with respect to the said structure, and an exteriorly knurled operating member or nut 18. This nut is manipulatable positively to force the tube 16 upwardly relative to the collet jaw structure 14 to effect positive holding of the screw 20. It is also manipulatable to release the tube and to move the tube downwardly relative to the jaw defining structure thereby to release the screw from the jaws, as will be described in greater detail hereinafter.

The handle 12 may be of suitable configuration but is preferably cylindrical in shape and has a rounded bottom 22. It is provided with a hollow recess 24 extending a substantial distance within the handle and which may be formed in the handle as by drilling. The hollow end of the handle is somewhat enlarged, as indicated by the reference character 26, to provide a strong abutment 28 engageable by the nut 18 when the latter is operated to effect positive gripping of the screw.

The collet jaw defining structure 14 is secured to the handle by an elongated rod 30, of smaller size than the structure to provide an abutment 31, the lower end of which rod is threaded, as indicated by reference character 32, and screwed into a threaded aperture in the lower end of the handle 12. The rod is securely held in place by suitable means, such as a lock nut 34 on the threaded portion 32 and rotatable into engagement with the bottom of the recess 24.

In accordance with one of the important features of the present invention, the collet jaw defining structure 14 is secured to the rod 30 for a limited degree of angular movement. The limited movement insures the accurate alignment of the collet jaws with the upper end of the collet tube 16, which is made non-circular for reasons which will be brought out fully shortly. The collet jaw structure 14 is threadedly secured to the upper end of the rod 30 so that it may move angularly relative thereto and may also be adjusted longitudinally relative to the rod to a desired position. The structure 14 is hollowed out for a goodly portion of its length, as indicated by reference character 36, and the lower end is provided with internal threads 38 cooperating with external threads 40 formed in the upper end of the rod 30. Angular movement between the structure 14 and the rod 30 is provided by a generally rectangular slot 42 formed in the lower end of the jaw structure and a pin 44 driven through the slot into the rod after the structure is properly located. The slot 42 preferably has an axial length of about a quarter of an inch and an arcuate extent of about 180 degrees to provide angular movement of approximately this extent between the rod 30 and the jaw defining structure 14.

The collet jaws are constituted by a plurality of individual radially outwardly biased jaw elements 50 formed integrally with and at the upper end of the structure 14 in a manner which will now be described with particular reference to Figs. 6, 7 and 8. The structure 14 is preferably formed of steel and the upper end is hardened after completion in order that the jaws will not become damaged in use and will firmly grip the screw. As previously indicated, the lower portion of the structure 14 is hollowed out and internally threaded at the lower end. The upper end, which has an outwardly tapered portion 52 engageable by the collet tube 16, is initially bored to provide an initially circular internal recess 54. The upper end is then provided with equally spaced apart slots 56 and 58, the former of which are relatively narrow, of a length equal to substantially half that of structure 14 and terminating in circular openings 60, and the latter of which are short and relatively wide. These slots are best illustrated in Figs. 7 and 8, which show the jaw structure in an intermediate step in its manufacture. Thereafter, the jaws 50 adjacent the wider slots 58 are forced together so that the slot 58 is wider at its closed end than at its open end, as best illustrated in Figs. 1 and 5, and the adjacent pairs of jaws are then spread radially outward so that the side walls of the slots 56 diverge toward the open ends thereof, as indicated in Fig. 6. The spread is such that the maximum diameter of the jaws in expanded position is greater than that of the tube 16 whereby when the tube is moved outwardly relative to the jaws, the latter are forced radially inward to grip the screw located within the recess 54. The initial forcing of adjacent jaws toward each other and the spreading of the resulting pairs of jaws apart, provides a non-circular screw holding and tube engaging construction having a number of advantages which will be brought out shortly.

The collet tube is provided with a non-circular upper end having a configuration corresponding generally to that of the exterior periphery of the collet jaws, as best illustrated in Fig. 5. The configuration may be described as being generally triangular in view of the fact that six jaws, or three pairs of jaws, are preferably used.

A greatly increased gripping action is provided by the forcing of adjacent jaws together, as illustrated in Figs. 5 and 6. The construction of the jaws with a circular bore or recess followed by the movement of the jaws toward each other, produces a non-circular aperture with the result that the opposite corners or edges 64 of the adjacent jaws extend radially inward farther than the adjacent corners and constitute sharp gripping surfaces.

The non-circular configuration of the jaws 50 and upper end 62 of the collet tube 16 insures that the jaws will not move relative to the tube when the screw driver has been operated positively to clamp the head of the screw. This prevents the application of any great twisting force upon the jaws, certain of which are rather long. Furthermore, the turning force exerted upon the screw is exerted through the tube 16, which is made of steel, as will appear more definitely shortly.

The movement of the collet tube relative to the collet jaws is effected by means of the operating nut 18. The nut 18 is movable angularly and axially relative to the collet tube 16, this movement being effected by means of a threaded connection between the nut and the collet tube structure by means of a threaded connection between a collet tube support 70 forming part of the tube structure and an internally threaded bushing 72 fixedly secured within a central recess 74 in the nut.

The collet tube support 70 has a central axial opening 76 therethrough of a diameter slightly greater than that of the rod 30, which it surrounds and along which it is movable.

The tube 16 is fixedly secured to the support 70. The securing is accomplished by threaded engagement between the lower end of the tube and an intermediate threaded portion 77 of the support. The lower end 78 of the tube preferably bears against the upper end of an enlarged externally threaded portion 80 of the support about which the internally threaded lower portion 82 of the insert is movable.

The lower end 78 of the tube constitutes an abutment limiting the upward movement of the nut 18 and its insert 72. The insert is provided with an axial recess 84 of a size to fit around the lower outer portion of the tube so that when the nut is rotated and moved away from the handle along the support 70, the bottom of the recess 84 engages the bottom 78 of the tube and limits movement of the nut.

The collet tube 16 and its support 70 are prevented from rotating by a pin and slot connection constituted by the pin 86 extending through the rod 30 and a slot 88. The pin and slot are located within the recess 24 in the handle.

In order to provide a good bearing surface between the nut and top 28 of the handle, there is provided a brass washer 90 secured in a recess 92 within the nut, as best illustrated in Fig. 2. The handle and nut may be made of some suitable material such as aluminum.

The tube and nut assembly is biased away from the handle normally resiliently to hold the collet jaws in contracted position by a helical spring 94 located within the hollow of the handle and bearing against the lock nut 34 and the lower end of the tube support 70. The upper limit of movement of the tube is determined by the engagement of the upper end of the tube support 70 with the shoulder 31 of the jaw defining structure 14. The relationship is such that when no screw is held by the clutch jaws, the spring 94 forces the tube into the position indicated in Fig. 3, whereat the jaws are substantially enclosed within the tube.

The operation of the screw driver will now be described. It is assumed that the nut 18, which is very easily rotatable by the thumb when the handle 12 is grasped in the hand, has been rotated substantially to its outermost position, i. e., to the position determined by the engagement between the bottom 78 of the collet tube and the bottom of the recess 84 in the nut insert 72. At this time, the spring 94 resiliently forces the collet tube into the position in which it is illustrated in Fig. 3, which is determined by shoulder 31 and whereat the tube substantially encloses the jaws 50. In this position of the nut, the tube is movable a maximum distance toward the handle to expose the jaws 50 to their greatest extent.

To expose the jaws, the nut 18 is moved toward the handle axially. This movement can be accomplished readily by use of the thumb, as illustrated in Fig. 4. The extent of movement of the tube is determined by engagement between the thrust washer 90 and the top 28 of the handle. When the tube is thus moved and the jaws exposed, the jaws are expanded because of their pre-expansion.

When the jaws are exposed and expanded as indicated in Fig. 4, it is a simple matter to pick up a surgical screw from a soft surface, such as a towel, without touching the screw. As a result, the screw remains sterile and can be inserted where desired. When the screw has been located with its head in the recess 54, the thumb nut is released and the spring 94 urges the tube and nut assembly toward the position indicated in Fig. 1. This movement of the tube outwardly results in the application of a resilient clamping force by reason of the engagement of the tube with the tapered outer surface 52 of the clutch jaws and the action of the spring.

The screw can be positively gripped by rotating the nut 18 toward the handle until the thrust collar 90 engages the top 28 of the handle. Continued rotation of the nut, which is prevented from moving further toward the handle by abutment 28, moves the collet tube 16 and its support 70 longitudinally away from the handle because the rotation of the tube is prevented by the pin 86 and slot 88. As a result, the tube 16 is positively forced outwardly and the screw is positively gripped.

Once the screw has been positively gripped, it can be driven simply by rotating the screw driver as a whole. The turning force is applied to the screw driver through the tube 16, which is now positively held relative to the handle. Consequently, the clutch jaws are not stressed unduly nor are they twisted because the non-circular configuration of the outer end of the collet tube prevents the jaws from twisting.

The non-circular arrangement of the jaws and collet tube also insures accurate location of the collet jaws within the tube because of the relative movement between the tube and jaws. It should be noted, also, that there is little likelihood of the misalignment of the jaws and tube once the tube has been assembled relative to the jaws and the two have been properly located. Proper location is insured by the fact that the jaws can move into their proper positions no matter what angular position the tube may be rotated into.

In order to release the screw, after it has been driven substantially all the way in, it is necessary only to rotate the nut 18 toward its upper position. Thereafter, the nut can be returned back toward the handle with the result that the collet tube is drawn toward the handle to expose and release the clutch jaws from the head of the screw. The screw can then be driven home by a conventional screw driver or a short bit adapted to be held by the screw driver of the present invention.

It should be understood that, while but a single embodiment of the invention has been illustrated and described in detail, the details thereof are not intended to be limitative of the invention. Furthermore, while the holding device has been described as a screw driver and illustrated and described in connection with holding and applying screws, other types of tools may be held thereby. Also, certain features of the invention are applicable not only to tool holders but to collet type holders generally.

Having thus described my invention, what I claim as new and desire to secure by Letters Patent is:

1. A bitless surgical screw driver, including in combination, a handle, a rod secured to the handle, radially outwardly biased collet jaws mounted at the free end of said rod, a collet tube structure surrounding the jaws and having an externally threaded portion, means biasing said collet tube structure outwardly along said rod to effect contraction of said jaws, a nut rotatably mounted on the externally threaded portion of said collet tube structure for movement axially outwardly relative to said tube to a position whereat said tube and nut are movable toward the handle against said spring to effect expansion of the jaws, said nut being rotatable toward the handle to engage it, whereby upon further rotation the collet tube is forced positively outwardly along said rod to effect contraction of said jaws.

2. A bitless surgical screw driver, including in combination, a handle, a rod secured to the handle, radially outwardly biased collet jaws mounted at the free end of said rod for limited angular movement relative to said rod, the outer periphery of said jaws being non-circular, a collet tube structure surrounding the jaws and having an externally threaded portion and a non-circular end adapted to engage the jaws, means restraining said structure against angular movement relative to said rod, means biasing said collet tube structure outwardly along said rod to effect contraction of said jaws, a nut rotatably mounted on the externally threaded portion of said collet tube structure for movement axially outwardly relative to said tube to a position whereat said tube and nut are movable toward the handle against said spring to effect expansion of the jaws, said nut being rotatable toward the handle to engage it, whereby upon further rotation the collet tube is forced positively outwardly along said rod to effect contraction of said jaws.

3. A screw driver, including in combination, a hollow handle open at one end, a rod secured to the handle and extending through the hollow and beyond the open end of said handle, radially outwardly biased collet jaws mounted at the free end of said rod, a collet tube structure surrounding the jaws and having an externally threaded portion, means restraining said structure against angular movement with respect to the rod, means including a spring inside said handle biasing said collet tube structure outwardly along said rod to effect contraction of said jaws, a nut rotatably mounted on the externally threaded portion of said collet tube structure for movement axially outwardly relative to said tube to a position whereat said tube and nut are movable toward the handle against said spring to effect expansion of the jaws, said nut being rotatable toward the handle to engage it, whereby upon further rotation the collet tube is forced positively outwardly along said rod to effect contraction of said jaws.

4. A collet jaw including a tubular member having at one end a plurality of pairs of generally longitudinally extending jaw elements, the members of each pair of elements being separated by a short slot which is relatively wide at its inner end and which narrows toward the free ends of the elements, there being a relatively long slot having side walls diverging toward the open end thereof between adjacent pairs of jaw elements, and each pair of jaw elements being biased radially outwardly from the inner ends of said longer slots.

5. A holding device including collet jaw structure comprising a plurality of pairs of generally longitudinally extending jaw elements, the members of each pair of elements being separated by a short slot which is relatively wide at its inner end and which narrows toward the free ends of the elements, there being a relatively long slot having side walls diverging toward the open end thereof between adjacent pairs of jaw elements and each pair of jaw elements being biased gradually radially outwardly from the inner ends of said longer slots, and said elements being of uniform angular extent cross sectionally whereby the jaws are noncircularly arranged, and a longitudinally movable collet tube having a noncirular portion cooperating with said jaws to effect expansion and contraction thereof.

6. A bitless surgical screwdriver including, in combination, a handle, a rod secured to the handle, collet jaws biased radially outward mounted at the free end of said rod, a collet tube structure surrounding the jaws and having an externally threaded portion, means restraining said structure against angular movement with respect to the rod, means biasing the collet tube structure outwardly along the rod to effect contraction of said jaws, a nut rotatably mounted on the externally threaded portion of said collet tube structure for movement axially outward relative to said tube to a position whereat said tube and nut are movable toward the handle against said spring to effect expansion of the jaws, said nut being rotatable toward the handle to engage it whereby upon further rotation the collet tube is forced positively outwardly along said rod to effect contraction of said jaws.

7. A bitless surgical screwdriver including, in combination, a handle, collet jaw structure secured to the handle including a plurality of collet jaws having internal noncircular portions forming sharp gripping surfaces adapted to seize the head of a standard size roundheaded surgical screw, said jaws having external noncircular peripheral portions, a collet tube to effect expansion and contraction of the jaws having a noncircular portion cooperating with said portions of the jaws and movable relative to the jaws to a position which opposes substantially the points of engagement between the screw head and the jaws, and means for forcibly moving said tube so as to position said tube in said substantial opposition to said points of engagement between the jaws and screw head.

EARL E. LONGFELLOW.

REFERENCES CITED

The following references are of record in the file of this patent:

UNITED STATES PATENTS

| Number | Name | Date |
| --- | --- | --- |
| 21,864 | Daniels | Oct. 19, 1853 |
| 414,619 | Weiss | Nov. 5, 1889 |
| 1,531,567 | Niblock | Mar. 31, 1925 |
| 1,558,225 | Boeker | Oct. 20, 1925 |
| 1,687,788 | Pinkus | Oct. 16, 1928 |
| 1,808,660 | Johnson | June 2, 1931 |
| 2,214,241 | Baxendale | Sept. 10, 1940 |
| 2,228,685 | Benjamin | Jan. 14, 1941 |
| 2,302,691 | Green | Nov. 24, 1942 |
| 2,320,611 | Kandle | June 1, 1943 |
| 2,370,407 | McCartney | Feb. 27, 1945 |